Patented Sept. 26, 1933

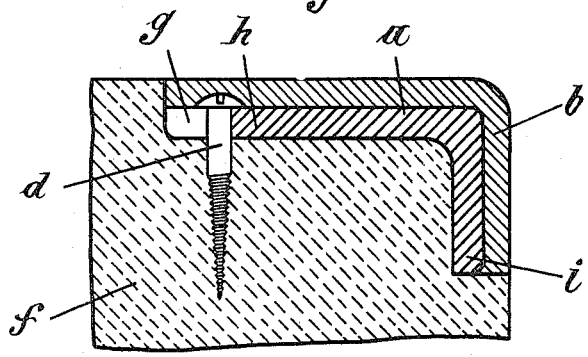
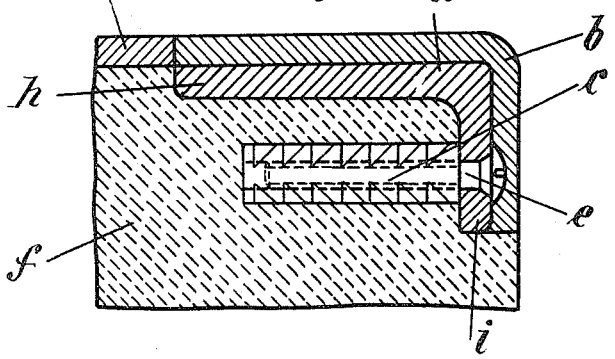
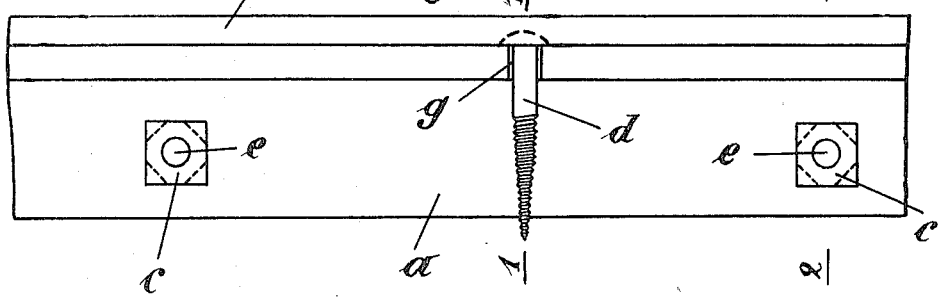

1,928,488

UNITED STATES PATENT OFFICE 1,928,488

FRONT EDGE COVERING FOR STAIRS AND THE LIKE

Theo Hammerschmidt, Blankenburg/Harz, Germany

Application January 27, 1932, Serial No. 589,220, and in Germany January 29, 1931

1 Claim. (Cl. 72—96)

This invention relates to an angle bar with a rubber layer vulcanized on the outer surface of the arms of the bar serving as an edge covering for stairs and similar building parts, which rubber layer is exchangeable when worn out, so that the bar can be again used after renewing the rubber layer. The edge covering according to the invention prevents slipping owing to the rubber layer arranged thereon. The exchangeability of the angle bar is rendered possible by one or more dowels attached by screws to one arm of the bar and extending parallel to and at a distance from the other arm thereof and by fixing screws which engage in slot-like recesses formed in the edge of the other arm.

An embodiment of the invention is illustrated by way of example in the accompanying drawing in which:—

Fig. 1 is a cross section of an edge covering taken on line 1—1 of Fig. 3.

Fig. 2 is a similar cross section to Fig. 1, taken on line 2—2 of Fig. 3.

Fig. 3 shows the stair edge covering in rear elevation.

The stair edge covering consists of an angle bar $a$ on which a rubber layer $b$ is vulcanized so that it covers the outer surface of the arms $h$, $i$ of the angle bar $a$.

Dowels $c$ and fixing screws $d$ are arranged on the stair $f$ at right angle the one to the other, so that the angle bar fixed thereon is rigidly held in such a manner that it cannot be removed from the stair by pressure or thrust. The fixing of the bar $a$ to the dowels $c$ is effected by screws $e$ which extend through the arm $i$ of the bar and are screwed into the dowel $c$, whereas the other arm $h$ is slipped under the head of the screws $d$, for which purpose slot-like recesses $g$ are formed in the longitudinal edge of the arm $h$ spaced according to the distance between the screws $d$. The fixing screws are always arranged half way between two dowels, the dowels being fixed to the arm $i$ of the bar $a$ by means of the screws $e$ and extending parallel to the arm $h$.

When the rubber layer $b$ is worn out, the angle bar $a$ can easily be removed from the stair by unscrewing the screws $e$ engaging in the dowels $c$, whereupon the angle bar can easily be slipped out from the fixing screws $d$.

Instead of the fixing screws dowels may also be employed, which are constructed like the dowels $c$ to which the bar $a$ is fixed by screws $e$.

The covering edge according to the invention can be employed on all new stairs and also on existing stairs. In the case of new stairs the covering edge is cast in the stair, the tight holding of the edge being increased by providing the dowels $c$ and the screws $d$.

In the case of existing stairs suitably deep holes are cut out and the edge covering cemented therein. The edge covering is laid either so that it is flush with the stair (Fig. 1), or it is employed in conjunction with a rubber, linoleum or other covering $j$ for the stair $f$ (Fig. 2). In the latter instance it is only necessary, to produce the difference in height for the rubber layer by correspondingly preparing the stair so that the two layers $b$ and $j$ are in the same plane.

I claim:—

A covering edge for stairs and similar building parts, comprising in combination an angle bar having two arms one arm provided with holes and the other arm with recesses alternating with said holes, a rubber layer vulcanized on and covering the outer surface of both arms of said bar, dowels arranged in the stair at a distance apart corresponding to the holes in one arm of said bars parallel to and at a distance from the other arm of said bar, screws passing one through each of the holes in the one arm of said bar adapted to fix said bar to said dowel, and fixing screws in the stair at right angles to said dowels each adapted to engage in one of said recesses.

THEO HAMMERSCHMIDT.